Patented Jan. 22, 1929.

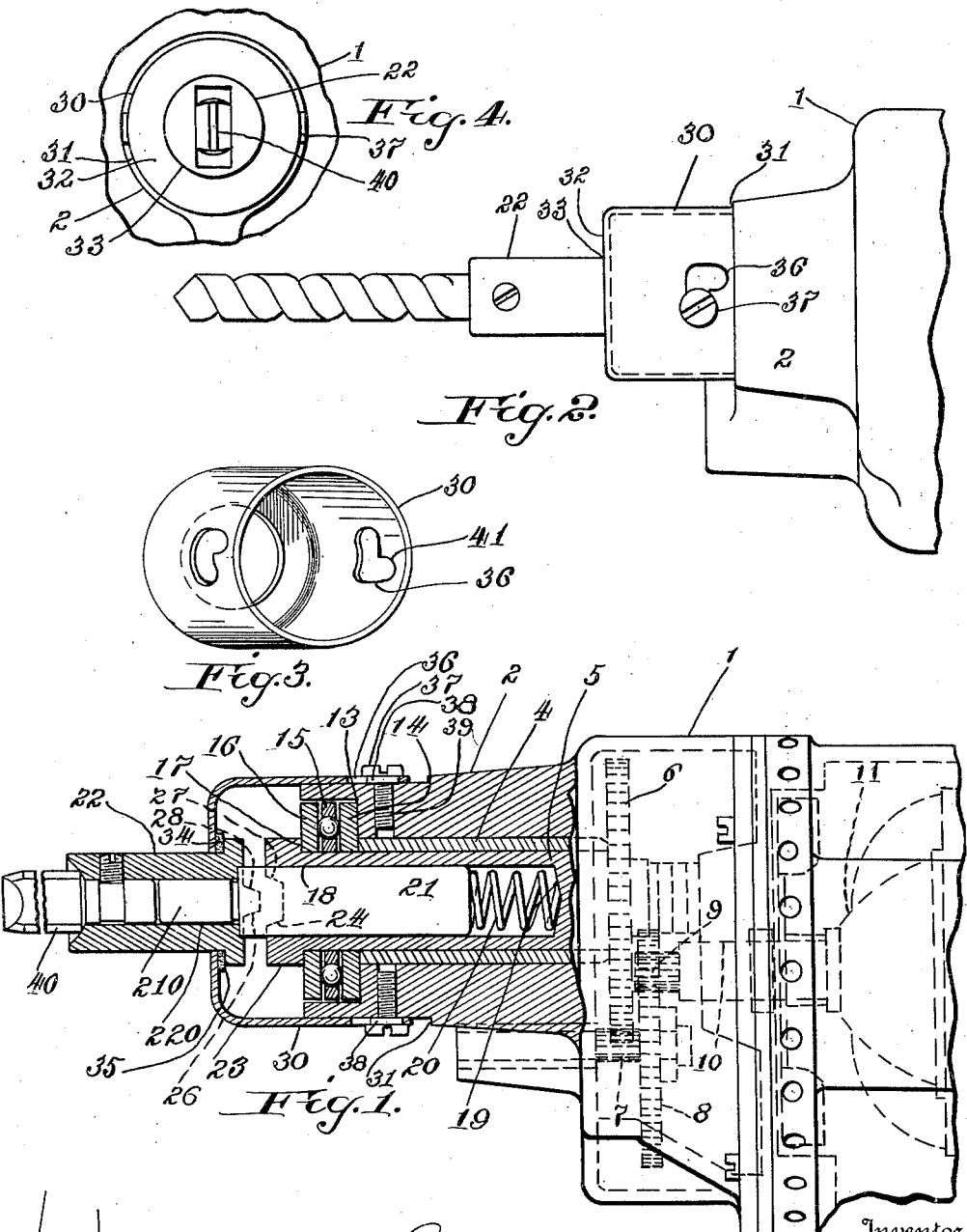

1,699,870

UNITED STATES PATENT OFFICE.

SAMUEL DUNCAN BLACK AND ALONZO GALLOWAY DECKER, OF BALTIMORE COUNTY, MARYLAND, ASSIGNORS TO THE BLACK & DECKER MANUFACTURING COMPANY, OF TOWSON, MARYLAND, A CORPORATION OF MARYLAND.

PORTABLE TOOL.

Application filed September 26, 1923. Serial No. 664,826.

The invention relates to rotary tools, and has been developed and used in connection with a power-driven rotary hand tool.

Some of the screw driving machines and power-driven hand screw drivers include in connection with the tool chuck or holder, a clutch which is released by a spring, so that the chuck and bit are only connected to the driving power or motor to be rotated thereby when pressure is applied to the bit or chuck. They are also released by the operation of the clutch when the screw driver bit encounters a predetermined resistance. This arrangement is of considerable advantage in driving screws, as it releases the screw as soon as it is driven home, and prevents disfigurement of the screw and splitting of the material by unduly prolonged application of the driving power.

The object of the present invention is to produce a tool which can be used as a combined screw driver or socket wrench and drill.

While motor driven screw drivers heretofore in use very closely resemble the similar class of drills, the screw driving tools are not considered applicable to drilling by mere change of bit from the screw driver to the drill on account of this releasing clutch, which disconnects the rotary drive as soon as pressure is removed from the bit, making it necessary to withdraw the drill from the hole which has been bored, directly without rotating, as there is no means for rotating the chuck except when pressure is applied to the tool in the direction of its axis. This feature makes the screw driving tools impractical for drilling, as withdrawal of the drill in this way, i. e., without rotation, results in sticking and in frequent breakage of the drill bits. Also the power driven drills are undesirable for screw driving because they lack the releasing feature.

The invention provides a combination tool which is equally as efficient for screw driving and socket wrench work as the previously constructed power driven screw drivers, and as efficient for the purposes of a power driven drill as the tools previously constructed solely for that purpose. The device comprises a rotary spindle and a tool holder in combination with a clutch which is spring released, the parts being in rotary driving engagement when pressure is applied in the direction of the axis, overcoming the spring, and a locking device for holding the releasing clutch in engagement while the tool is being used as a drill, eliminating the releasing feature and providing for rotating the drill while it is being withdrawn from the work, the parts being unlocked and the clutch being permitted to engage and disengage automatically as aforesaid when the tool is used for driving screws or as a wrench.

In the accompanying drawings we have illustrated so much of a rotary power driven hand tool in the nature of a combination drill, bit and screw driver, as is necessary to a full comprehension of the nature and operation of our improvement.

In the drawings,

Figure 1 is an elevation of an electrically driven rotary hand tool provided with the improvement of our invention, certain parts being broken away for convenience of illustration, the spindle, etc. being shown in section.

Figure 2 is an elevation showing the bit and the parts of the tool immediately adjacent the bit.

Figure 3 is a perspective view of the locking ring or shell, and

Figure 4 is a bottom plan looking at the tool from the clutch end, the bulk of the casing being broken away for convenience of illustration.

Referring to the drawings by numerals, the illustration includes a tool frame or casing 1, having a tubular extension 2, the bore or opening in which in the form of the invention shown is provided with a tubular bearing sleeve 4 in which is mounted a rotary spindle 5 which may be driven from any suitable source, and which in the form of the invention shown is secured to a toothed gear 6, which is driven by a reducing train of gears 7, 8, 9, the latter being secured to the shaft 10 of a motor 11, which in the tool illustrated is an electric motor, the device of the invention being illustrated as applied to a combination electric drill, screw driver and socket wrench.

We have shown the tubular portion of frame 2 provided with an internal annular shoulder 13 which with the lower end of bearing sleeve 4 serves as a seat for the upper ring 14 of an annular thrust bearing 15, the lower ring member 16 of which rests on an external shoulder 17 on the spindle 5 near the lower end. This spindle is hollowed out or bored concentrically with its axis at 18, the bore extending upward from the lower end and terminating within the spindle at 19, the end wall 19 of the bore serving as a seat for a helical spring 20 which is placed therein and which engages the shank 21 of the tool holder or chuck member 22, which shank enters the bore 18 with a sliding fit and moves back and forth therein in response to the tension of the spring 20 and the pressure on the bit 40 as the latter overcomes the tension of the spring.

In explanation of the drawing it is noted that the shank 21 is secured to the chuck proper 22 by a stud 210 on the shank which enters the bore 220 in the chuck, the same being secured in any suitable and convenient manner.

The lower edge or end 23 of the spindle 5 is provided with clutch teeth or notches 24, and the tool holder or chuck 22 is provided with co-operating clutch teeth 26, the teeth 26 and notches 24 being preferably tapered or having their engaging surfaces 27, 28 oppositely inclined to provide for releasing the clutch when a predetermined resistance is encountered, as when a screw or bolt, which is being driven, is seated, the tool as thus far described being adapted for use as a screwdriver or socket wrench.

In using the tool as a screw driver or socket wrench, the clutch 24, 26 is normally disengaged by the action of the spring 20, which thrusts the chuck member 22 forward or downward, the pressure on the bit being sufficient to overcome the tension of the spring, serving to compress the spring, thrusting the chuck member toward the spindle and bringing the clutch teeth into engagement for the driving of a screw or the seating of a nut or bolt.

To use the tool as a drill, it is desirable to do away with the releasing feature, and to this end we provide means for locking the clutch in engagement so that for the purposes of the drilling operation the spindle and chuck are locked together, so that they operate as a single integral member.

In the present instance this locking is accomplished by means of a locking ring or shell 30 which is substantially cylindrical in outline and encloses the lower end of the tubular extension 2 of the frame which surrounds the spindle. In the form of the invention shown this tubular extension is reduced to the internal diameter of the shell and shouldered at 31. The lower end of the shell is partially closed, the end wall 32 being centrally apertured at 33 to pass the chuck or tool holder 22, which latter is provided with an external annular shoulder 34 which engages the end wall or flange 32 of the shell 30 with its upper surface adjacent the aperture 33.

In the illustration we have shown a packing ring or washer 35 to take up friction between the parts at this point.

To provide for locking of the clutch in engagement, the shell 30 is provided with angular or bayonet slots 36, such slots preferably having one arm parallel to the axis or normally vertical and the other at right angles thereto, i. e., in the direction of the circumference of the shell or normally horizontal. These slots 36 are engaged by screws 37, which, as shown, are seated radially in the tubular portion of the frame 1, the screws being as shown shouldered or enlarged near their heads at 38 to a size greater than the diameter of the threaded portion 39, which shoulders substantially fit the slots 36.

In view of the description it will be easily understood that when the clutch teeth and notches 26 and 24 are opposite each other or when the spindle is rotating, pressure on the bit or drill 40 or on the chuck 22 will bring them into mesh, causing the clutch to engage, and that at any time when the clutch teeth are in engagement, the shell 30 may be rotated by hand, in the form of the invention shown it should be rotated counter-clockwise, causing the screws 37 to enter the horizontal arms of the slots 36, which are so spaced as to cause the lock under these circumstances to hold the clutch in engagement by action of the shell or ring in its upper or locking position, locking the flange 32 against the shoulder 34 on the chuck, the arm 41 of the slot which is parallel to the axis being extended upward so that when the shell is rotated from the position just described in right-handed or clockwise direction, the screws on entering this vertical portion of the slot 36 release the clutch in response to the action of the spring 20.

It will also be understood that when the clutch is locked, as just described, the chuck is driven positively through the chain of gearing 6, 7, 8, 9 from the motor shaft 10, so that it is suitable for use as a drill or for other purposes for which a tool having a continuously rotating spindle is desirable, and that when the lock is released, the tool becomes adapted for use as a screw driver or socket wrench, the spindle being driven only when the chuck or tool is subjected to pressure in the direction of the axis and being preferably released on encountering a predetermined resistance.

We have thus described specifically and in detail a single embodiment of our invention in order that the nature and operation of the same may be clearly understood, however, the specific terms herein are used descriptively rather than in a limiting sense, the scope of the invention being defined in the claim:

What we claim and desire to secure by Letters Patent is:

A portable electric tool adapted for use as a screw driver, wrench, or drill, the same comprising an electric motor, a tool chuck, a positive overload releasing clutch for connecting the chuck to the motor, a spring holding the same normally disengaged, the clutch being engaged by pressure of the tool against the work, the parts being thus normally adapted to operate as a wrench or screw driver, and means for locking the clutch in engagement whereby the device is adapted for use as a drill, said locking means comprising a ring and a pin and bayonet slot whereby the ring is locked and released, locking and releasing the clutch.

Signed by us at Baltimore, Maryland, this 24th day of September, 1923.

SAMUEL DUNCAN BLACK.
ALONZO GALLOWAY DECKER.